United States Patent [19]

Stump et al.

[11] 3,794,928

[45] Feb. 26, 1974

[54] FREQUENCY SHIFT KEYED DEMODULATOR

[75] Inventors: Theodore M. Stump, Costa Mesa; Jerry G. Williford, Tustin, both of Calif.

[73] Assignee: Collins Radio Company, Dallas, Tex.

[22] Filed: Apr. 18, 1973

[21] Appl. No.: 352,377

[52] U.S. Cl. ................. 329/104, 178/66 R, 325/30, 325/163, 325/320, 329/122, 331/23, 332/9

[51] Int. Cl. .......................... H04l 27/14, H03b 3/06

[58] Field of Search ...........332/9 R; 329/104, 122; 331/18, 23, 25; 325/163, 320, 30, 419; 178/66 R, 88

[56] References Cited

UNITED STATES PATENTS

| | | | |
|---|---|---|---|
| 3,163,823 | 12/1964 | Kellis et al. | 325/320 X |
| 3,401,353 | 9/1968 | Hughes | 331/18 X |
| 3,603,890 | 9/1971 | Camenzind et al. | 329/122 X |
| 3,714,595 | 1/1973 | Denenberg et al. | 325/419 X |

*Primary Examiner*—Alfred L. Brody

[57] ABSTRACT

A frequency shift keyed (FSK) modem (modulator and/or demodulator) utilizing a phase lock loop which modem may operate at any of several predetermined frequencies and whose output for the modulator section, is combined with a frequency shift keyed signal and the result passed through a low pass filter to provide a frequency shift keyed output. The phase lock loop also supplies signals to the receive or demodulation section. The use of a multiple frequency phase lock loop negates the requirements for a plurality of bandpass filters of different frequencies to be used with the frequency shift keyed source.

4 Claims, 3 Drawing Figures

FREQUENCY SHIFT KEYED DEMODULATOR

THE INVENTION

The present invention is generally related to oscillators and more specifically related to a frequency shift keyed oscillator usable for a plurality of different frequency channels.

PRIOR ART AND BACKGROUND OF THE INVENTION

Although the inventive concept is applicable to demodulators as well as modulators, the slight detail differences dictate discussing the inventive concept from the standpoint of the modulator and the applicability to demodulators will be discussed later.

The prior art has provided frequency shift keyed modulators. However, in order to obtain different channels of operation, different frequency bandpass filters were used to obtain different frequency outputs.

The use of different frequency bandpass filters provided adequate frequency characteristics but it required a large inventory of bandpass filters if a modulator were to be used in a number of different frequency applications. One such method was to use a switching means to switch between the various frequency filters. However, the use of more than one filter greatly increased the physical size of the unit. If the filter is to be removed and replaced by another filter to change operational frequency, there is always the possibility of losing some of the filters. Additionally, precise frequency bandpass filters can be quite expensive.

The present invention on the other hand uses a single bandpass filter and a dividing network which can be easily altered by changing the positioning of straps in a frequency dividing circuit so that the dividing circuit will, with a single input frequency, provide different output frequencies depending upon the dividing function. The result is accomplished by raising the frequency shift keyed carrier signal to a much higher frequency than is required at the output, combining it with the FSK signal, and then bandpass filtering the combination to provide the desired band limiting. The phase lock loop provides the required translation frequencies which allow a common intermediate frequency (at which the filtering is done) to be used. The high frequency carrier in one embodiment is also used in a divided version to supply signals to a phase lock loop which can be altered to operate at various frequencies. The output of the phase lock loop is then recombined with the FSK signal from the bandpass filter and the output thereof lowpass filtered to obtain the moudlator difference frequency FSK output. The summation frequency is enough higher that the lowpass filter easily provides adequate separation to prevent passage thereof and to further prevent passage of frequencies generated by the phase lock loop and the bandpass filter.

It is therefore an object of the present invention to provide an improved frequency shift keyed modem system.

Further objects and advantages of the present invention may be ascertained from a reading of the specification and appended claims in conjunction with the drawings wherein:

DETAILED DESCRIPTION

Figure 1:
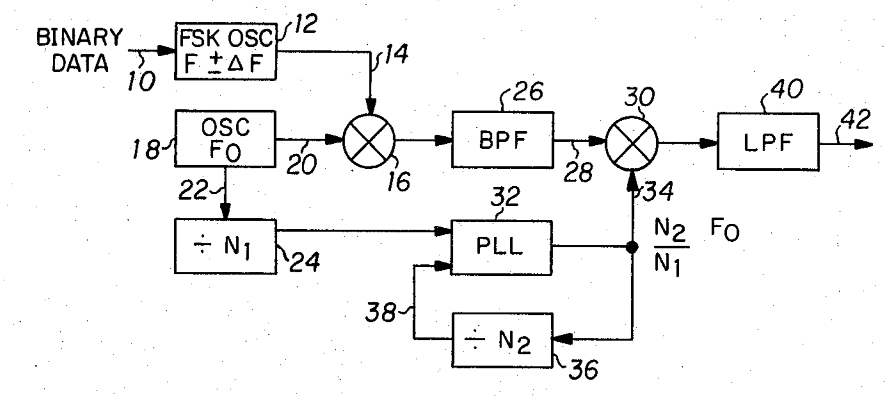
FIG. 1 illustrates a preferred embodiment of the inventive concept.

A lead 10 supplies binary data into a frequency shift keyed oscillator 12 which operates in accordance with the binary data input to provide output frequencies of $F + \Delta F$ or $F - \Delta F$. This oscillator may be of the type shown in application serial number 6061 filed of even date herewith in the name of Jerry Williford and assigned to the same assignee as the present invention or may be of the type shown in more detail in FIG. 2. This output signal is provided on lead 14 to a mixer, modulator or signal combiner circuit 16. An oscillator 18 provides further input signals on a lead 20 to the mixer 16. In addition, the same frequency or a different frequency may be supplied on an output lead 22 from oscillator 18 to a dividing circuit 24. A bandpass filter 26 receives the sum and difference output signals from signal combining circuit 16 and provides a bandpass filtered output on a lead 28 to a second signal combining circuit, modulator or mixing means 30. The bandpass filters such as 26 are used to restrict the spectrum from the FSK modulators to a specified band. An output of dividing circuit 24 supplies an input signal to a first input of a phase lock loop circuit 32 which has an output supplied both to the mixer 30 on a lead 34 and to an input of a second dividing circuit 36. An output of the dividing circuit 36 is supplied to a second input of phase lock loop 32 on a lead 38. An output of the signal combining circuit 30 is provided to a lowpass filter 40 which has an output 42 supplying frequency shift keyed audio signals as an apparatus output.

Figure 2:
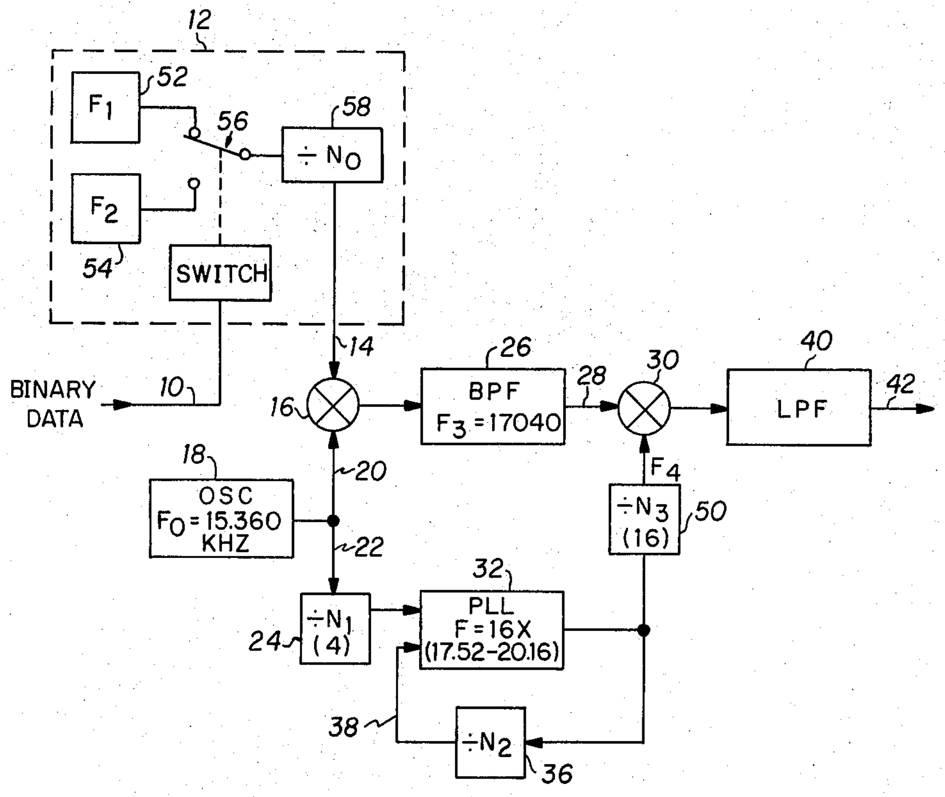
FIG. 2 illustrates a modified circuit format of the embodiment of FIG. 1.

Referring now to FIG. 2, it will be noted that many of the blocks have the same number as presented in FIG. 1. The only major difference is an additional dividing circuit 50 which appears between the output of phase lock loop 32 and the input of the signal combining circuit 30. In addition, one embodiment of a frequency shift keyed oscillator 12 is shown in more detail as having first and second frequency sources 52 and 54 whose outputs are passed through a dual position switch generally designated as 56 and is applied to a dividing circuit 58 before being supplied to the output lead 14. The switch 56 is operated in accordance with the binary data coming in on lead 10 and will be in one position with a logic 1 appearing and in the opposite position with a logic 2. While the dividing circuit 58 is not necessary to practice the invention, the switch without the dividing circuit 58 would tend to interrupt the signals at points other than a common phase position. Thus, by having the frequency of the sources 52 and 54 much higher than necessary to practice the invention, the dividing circuit will reduce the effect of any phase ambiguity at the input as passed to the output thereof.

As will be ascertained from later descriptions, the dividing circuit 24 of FIGS. 1 and 2 would not be required in all embodiments of the invention and the dividing circuit 50 of FIG. 2 also would not be required in all embodiments. The practical limitation involved is the frequency obtainable by the oscillator contained within phase lock loop 32. If practical frequency operating limits are exceeded, then dividing circuits may be placed in front of or after or in both positions with respect to the phase lock loop 32 to lower the frequency range operating requirements of the oscillator. The phase lock loop 32 may be one such as shown in Motorola, Incorporated application note AN-535 entitled Phase Lock Loop Design Fundamentals issued in 1970. The rest of the components such as dividing networks and the bandpass and lowpass filters are standard products with the dividing circuits merely being a series of flip-flops which can be strapped to change the effective dividing operation of divider 36.

Examples of a divider such as divider 36 which may be strapped to different dividing numbers may be found in Motorola application note AN/584 or in National Semiconductor Device Specification DM-7520.

In one embodiment of the invention, the oscillator 18 operated at 15,360 Hz, the dividing network 24 divided by 4, the phase lock loop 32 provided output signals varying from 280,320 to 322,560 Hz depending upon which of the various dividing numbers the divider 36 was set to between 73 and 84. The divider 50 was set to divide by 16, the bandpass filter provided a center frequency bandpass of 17,040 Hz and the lowpass filter 40 had a cutoff frequency of 3,400 Hz. The oscillator 12 provided output signals on line 14 of 1,620 Hz and 1,740 Hz.

Figure 3:
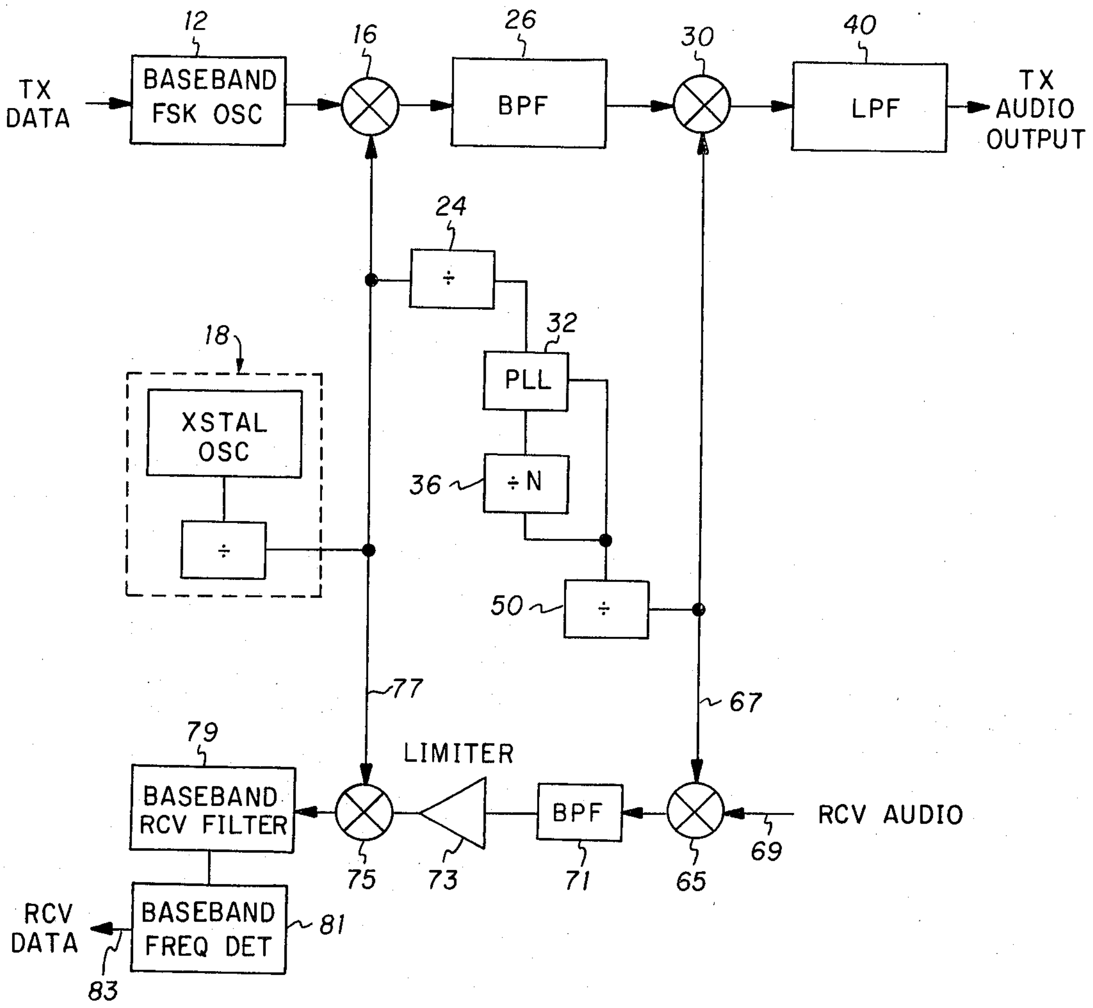
FIG. 3 is a block diagram of a modem incorporating the inventive concept.

As will be noticed, FIG. 3 also contains many of the same designations as found in FIG. 2. The crystal oscillator and a dividing circuit are lumped together under the designation 18 as is found in FIG. 2 since in some instances a crystal oscillator will provide such a high frequency that it cannot be used directly by the mixer 16. The top portion of FIG. 3 is the modulator section while the lower portion, which uses the same two frequencies as does the modulator, is the demodulator section. As shown, a mixer 65 is receiving signals on lead 67 from the dividing circuit 50 and is receiving the FSK audio input on a lead 69. The output of mixer 65 is supplied to a bandpass filter 71 may in some embodiments have the same bandpass frequency as filter 26. The output of this filter is then limited in a limiter 73 before being applied to a further mixer 75 which receives the same frequency signals from a lead 77 as does mixer 16. The output of mixer 75 is then supplied to a baseband receive bandpass or lowpass filter 79 which passes the same frequency as is originally supplied from oscillator 12. The output of the filter 79 is then supplied to a baseband frequency detecting network 81 which provides the received output data on a lead 83.

OPERATION

Starting at combining circuit 30 of FIG. 1 it will be realized that if an input frequency of 17,040 Hz is supplied on lead 28 and a signal of 17,520 Hz is supplied on lead 34, the output supplied to lowpass filter 40 will be both the sum and the difference. The sum would, of course, be 34,560 Hz while the difference would be 480 Hz. The lowpass filter 40 would readily pass the difference frequency of 480 Hz but would not pass the high frequency signal of 34,000 Hz. If the signal on lead 34 were increased to its maximum of 20,160 Hz, then the output would be the combination or 37,200 Hz and the difference of 3,120 Hz. Again, since the cutoff frequency of lowpass filter 40 is 3,400 Hz, the 3,120 Hz signal would be passed to the output 42.

The phase lock loop 32 in conjunction with a dividing circuit will provide an output signal having a frequency of N2 times the input signal supplied from divider 24. This is because the phase lock loop seeks to balance the two input signals. The divider 36 reduces the frequency as supplied at the output on lead 34 by decreasing its dividing numbers to increase the frequency of the signal supplied on lead 38. The PLL 32 wil adjust its output downward to match the input supplied from block 36 with that received on line 38.

Using the numbers provided above, the signal supplied from block 24 would be 3,840 Hz and the output from the phase lock loop in FIG. 2 would be somewhere in the range of 280,320 Hz to 322,560 Hz. The range would occur, of course, with the dividing circuit 36 changing in its division numbers from 73 to 84.

It is believed to be obvious in view of the above description that using an oscillator of 15,360 Hz for 18 and combining this signal with the two frequencies from source 12 will provide an output to the bandpass filter 26 of the sum and the difference of the signal supplied from 18 with each of the signals supplied from 12. The two summation frequencies would be 16,980 Hz and 17,100 Hz, both of which would pass through the bandpass filter 26. However, the difference frequencies of 13,740 Hz and 13,620 Hz would be too low to pass the bandpass filter 26.

While the oscillator 18 is not a necessary part of the invention, a high frequency crystal oscillator with a suitable divider prior to its output provides a much more stable frequency source than if a lower frequency were used for the source input to the phase lock loop 32 and for the frequency shift keyed signal. In view thereof, it is believed that the present inventive concept includes using a frequency shift keyed signal such as obtained on lead 28 and combining this with a further signal which may be any one of a plurality of frequencies as may be found at the output of block 50 and combining these two signals to obtain any one of various frequency channels of operation at the output of filter 40.

While it is believed unnecessary to provide any further operational material in view of the above, a very brief deription of FIG. 3 will be provided. As may be inferred, the top portion of FIG. 3 is identical in operation to FIG. 2. In the bottom portion, the signal is received on lead 69 and combined with the signal received on lead 67 to obtain a sum and difference wherein the difference frequency is passed by the bandpass filter 71. This signal is then limited to prevent saturation of modulator 75 which combines the output of the limiter with the signal received from oscillator 18. Again, a sum and difference output is obtained from modulator 75 with the difference frequency being passed by filter 79. The output of filter 79 is substantially the same frequency as that provided by oscillator 12 and in one embodiment of the invention was approximately 1,680 Hz. This signal, which is still frequency shift keyed, is then detected by detector 81 and the binary data output is provided on lead 83.

As indicated previously, the inventive concept relates to the use of a phase lock loop or other means for providing multiple frequency signals to either a modulator or a demodulator so that only a single bandpass filter is required for many different frequencies of operation.

In view thereof, I wish to be limited not by the specific embodiment disclosed and described in detail, but only by the scope of the invention as claimed in the appended claims wherein I claim:

1. Frequency shift keyed apparatus comprising, in combination:

first signal supply means for supplying first signals of first and second frequencies at a first output means indicative of data;

second signal supplying means for supplying second and third signals of third and fourth frequencies at first and second outputs thereof;

first and second signal combining means, each including first and second input means and output means; said signal combining means providing output signals at said output means thereof indicative in frequency of the sum and difference frequencies of signals supplied at said first and second input means thereof;

irst filter means, including input means and output means, for passing fourth signals of a frequency commensurate with one of the sum and difference of said first and second frequencies with said third frequency;

means connecting said first output means of each of said first and second signal supplying means to said first and second input means respectively of said first signal combining means for supplying said first and second signals thereto;

means connecting said output means of said first signal combining means to said input means of said first filter means;

means connecting said second output means of said second signal supplying means and said output means of said first filter means to said first and second input means, respectively, of said second signal combining means; and second filter means, including apparatus output means, connected to said output means of said second signal combining means for supplying signals to said apparatus output means indicative in frequency of one of the difference and summation frequencies in the signal supplied thereto.

2. FSK apparatus as claimed in claim 1 wherein:

said first filter means is a bandpass filter;

said second filter means is a lowpass filter; and said second signal supplying means includes a phase lock loop.

3. FSK apparatus as claimed in claim 1 wherein said second signal supplying means includes:

signal source means for supplying said second signals at said third frequency;

frequency dividing means, connected to said signal source means for receiving said second signal therefrom and for providing output sixth signals at a frequency lower than said third frequency; and means for increasing frequency, connected between said frequency dividing means and said second output means of said second signal combining means for increasing the frequency of the signal received from said frequency dividing means to said fourth frequency.

4. FSK apparatus as claimed in claim 3 wherein said means for increasing frequency includes a phase lock loop system for altering said fourth frequency in accordance with a desired frequency output channel.

* * * * *